(12) United States Patent
Johnson et al.

(10) Patent No.: US 9,488,067 B2
(45) Date of Patent: Nov. 8, 2016

(54) AIRCRAFT ANTI-ICING SYSTEMS HAVING DEFLECTOR VANES

(71) Applicant: The Boeing Company, Chicago, IL (US)

(72) Inventors: Rick A. Johnson, Kirkland, WA (US); Victor D. Pham, Seattle, WA (US); Daniel H. Gally, Seattle, WA (US); Joseph James Seydel, Mount Prospect, IL (US); Edward Charles Natsui, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 397 days.

(21) Appl. No.: 14/154,967

(22) Filed: Jan. 14, 2014

(65) Prior Publication Data
US 2015/0198061 A1    Jul. 16, 2015

(51) Int. Cl.
*F01D 25/02* (2006.01)
*B64D 15/04* (2006.01)
*F02C 7/047* (2006.01)

(52) U.S. Cl.
CPC ............ *F01D 25/02* (2013.01); *B64D 15/04* (2013.01); *F02C 7/047* (2013.01); *Y02T 50/671* (2013.01)

(58) Field of Classification Search
CPC .......... F01D 25/02; F02C 7/042; F02C 7/04; F02C 7/047; B64D 15/04
See application file for complete search history.

(56) References Cited

U.S. PATENT DOCUMENTS

| | | | | | |
|---|---|---|---|---|---|
| 1,827,276 | A | * | 10/1931 | Alfaro | B64D 15/04 244/134 B |
| 3,933,327 | A | * | 1/1976 | Cook | B64D 15/04 244/134 B |
| 3,983,962 | A | * | 10/1976 | Torke | F16F 7/12 188/377 |
| 4,084,029 | A | * | 4/1978 | Johnson | B29D 99/0003 156/210 |
| 4,095,417 | A | * | 6/1978 | Banthin | F02K 1/825 239/127.3 |

(Continued)

FOREIGN PATENT DOCUMENTS

| | | |
|---|---|---|
| EP | 2204320 | 7/2010 |
| EP | 2894096 | 7/2015 |
| WO | 2011073561 | 6/2011 |

OTHER PUBLICATIONS

Canadian Intellectual Property Office, "Examiner's Report," issued in connection with Canadian Patent Application No. 2,865,853, issued on Oct. 5, 2015, 3 pages.

(Continued)

*Primary Examiner* — Jason L Vaughan
(74) *Attorney, Agent, or Firm* — Hanley, Flight & Zimmerman, LLC (57) ABSTRACT

Apparatus and methods to lower peak temperatures and improve performance of aircraft anti-icing systems are described herein. One described example apparatus includes a skin on an inlet side of a nacelle of an aircraft defining an annular chamber, a gas delivery system disposed within the annular chamber to provide a first gas to mix with and entrain a second gas in the annular chamber to define a flow through the annular chamber, and a deflector vane disposed within the annular chamber to redirect the flow through the annular chamber. The second gas is at a different temperature from the first gas.

21 Claims, 9 Drawing Sheets

(56) References Cited

U.S. PATENT DOCUMENTS

| | | | |
|---|---|---|---|
| 4,688,745 A | 8/1987 | Rosenthal | |
| 4,752,049 A * | 6/1988 | Cole | B64D 15/04 244/134 B |
| 5,088,277 A * | 2/1992 | Schulze | B64D 15/04 244/134 R |
| 5,114,103 A | 5/1992 | Coffinberry | |
| 5,257,498 A | 11/1993 | Nikkanen et al. | |
| 5,451,015 A * | 9/1995 | Cronkhite | B64D 37/02 244/119 |
| 6,267,328 B1 | 7/2001 | Vest | |
| 6,698,691 B2 * | 3/2004 | Porte | B64D 15/04 244/134 B |
| 6,702,233 B1 * | 3/2004 | DuPont | B64D 15/04 244/134 B |
| 7,131,612 B2 | 11/2006 | Baptist et al. | |
| 7,210,611 B2 * | 5/2007 | Sanders | B21D 26/055 228/112.1 |
| 7,922,126 B2 * | 4/2011 | Meister | B64C 21/025 244/123.12 |
| 8,240,982 B2 * | 8/2012 | Vauchel | B64D 15/12 415/119 |
| 8,413,922 B2 * | 4/2013 | Porte | B64D 15/04 181/214 |
| 8,783,619 B2 * | 7/2014 | Hormiere | B64D 15/04 244/134 B |
| 2009/0108134 A1* | 4/2009 | Thodiyil | B64D 15/04 244/134 B |
| 2012/0248249 A1 | 10/2012 | Hormiere et al. | |

OTHER PUBLICATIONS

European Patent Office, "Extended Search Report," issued in connection with European Patent Application No. 14184866.3, issued on May 18, 2015, 7 pages.

* cited by examiner

AIRCRAFT ANTI-ICING SYSTEMS HAVING DEFLECTOR VANES

FIELD OF THE DISCLOSURE

This patent relates generally to aircraft anti-icing systems and, more particularly, to aircraft anti-icing systems having deflector vanes.

BACKGROUND

Ice formation or accretion on the leading edge of an aircraft engine inlet may adversely affect air flow into the engine. Furthermore, ice formations near or on an inlet of an aircraft nacelle can detach and impact the engine fan blades potentially causing damage to the engine, thereby resulting in reduced performance and/or negatively impacting operating margins of the aircraft. Pneumatic thermal anti-icing systems route heated air to a chamber in the nacelle to heat the surface of the inlet to prevent the formation of ice. These anti-ice systems often have a nozzle supplying the heated air to the chamber. The heated air from the nozzle may cause areas of localized heat with corresponding localized high peak temperatures on the surface of the nacelle receiving the direct jet impingement, thereby causing damage to the surface (e.g., deformation, loss of structural strength or margins, etc.) and/or necessitating selection of relatively more expensive material(s) to withstand the high localized temperatures.

SUMMARY

One described example apparatus includes a skin on an inlet side of a nacelle of an aircraft defining an annular chamber, a gas delivery system disposed within the annular chamber to provide a first gas to mix with and entrain a second gas in the annular chamber to define a flow through the annular chamber, and a deflector vane disposed within the annular chamber to redirect the flow through the annular chamber. The second gas is at a different temperature from the first gas.

Another described example apparatus includes a chamber in an outboard structure of an aircraft, a gas delivery system disposed within the chamber having an outlet to provide a gas to the chamber, the gas to define a flow through the chamber, and a deflector vane disposed within the chamber to redirect the flow through the chamber. The chamber is on a fore side of the outboard structure.

One described example method includes receiving a gas into an inlet duct of an aircraft, the gas to define a flow through the inlet duct in a first flow path direction, and redirecting the flow in a second flow path direction within the inlet duct.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Apparatus to improve manufacturability, reduce cost and complexity, and provide an even distribution of heat (e.g., lowering localized peak temperatures and/or raising localized minimum temperatures of low temperature areas, etc.) of an anti-icing system for an aircraft engine nacelle are described herein. Engine inlet ice protection systems ("EI-IPS") systems generally use heated and/or compressed air from an engine to heat a chamber (e.g., inlet duct, annular chamber, etc.) and entrain cooler air to define a flow through the chamber to prevent the formation of ice. Ice formations may reduce performance of the aircraft by preventing air from flowing into the engine and may damage the engine (e.g., an ice slab detaching and impacting engine fan blades). The heated air is typically moved from the engine through a duct and into a nozzle located within the chamber. The heated air flows through the chamber, thereby heating the surrounding area and inlet surfaces to prevent the formation of ice. Many EIIPS systems allow the flow to move in a circulating motion through the chamber of the nacelle. The chamber may also have an exit port to allow a portion or all of the flow to exit as the flow circulates through the chamber.

Anti-icing systems direct heated gas (e.g., air) into a chamber via a gas delivery system (e.g., a nozzle). Many known anti-icing systems employ a nozzle in the chamber to direct the heated gas into the chamber. Often, the flow emerging from the nozzle directly impinges on a surface of an inlet (e.g., skin surface, lip skin, skin etc.), which at least partially defines the chamber. This flow impingement can cause localized heating (e.g., localized temperature rises, high peak temperatures, etc.) of the inlet surface (e.g., areas of thermal concentration). High peak temperatures associated with this flow impingement may cause significant damage to the skin surface and/or necessitate selection of relatively more expensive materials (e.g., titanium, etc.) instead of relatively inexpensive materials (e.g., aluminum, etc.) to withstand the higher peak temperatures. Other possible solutions to reduce peak localized temperatures, including specialized nozzles or special ducting, may be relatively expensive and negatively impact weight requirements.

In accordance with the teachings of this disclosure, an example anti-icing system may implement a deflector vane, which may be located in an inlet chamber (e.g., duct) of a nacelle defined by a surface of an inlet. The deflector vane, which may be mounted to a bulkhead or any other appropriate location in the inlet chamber, redirects the heated gas from the nozzle to prevent the formation of localized high temperature areas of the inlet by increasing flow distance and/or mixing with cooler gas before the gas impinges the inlet surface (i.e., increase viscous dissipation of the heated gas), and/or to heat a portion of the nacelle, thereby more effectively preventing ice from forming Numerous deflector vanes may be used to continuously deflect the heated gas. Additionally or alternatively, the deflector vanes may also be arranged to increase mixing of the heated gas with relatively cooler gas in the chamber to provide more even heat distribution of the inlet surface and/or the chamber. In addition to reducing peak temperatures in the inlet, the improved heat distribution may allow more effective anti-icing due to more heat spreading to portions adjacent the chamber that would otherwise receive less heat.

The example apparatus described herein eliminates the need to use more expensive materials for the inlet, eliminates the need for piccolo tubing routed throughout the chamber, reduces and/or eliminates the use of small ports (e.g., a showerhead configuration), potentially reduces bleed flow necessary to meet performance requirements, and reduces nozzle complexity as seen, for example, in the piccolo tubing nozzle described in U.S. Pat. No. 4,688,745, which is incorporated by reference in its entirety. These systems are expensive to produce, highly complex for maintenance and may impose significant cost and/or manufacturability risk to the airplane. In some cases, these systems may negatively impact weight requirements of the airplane. Additionally, through more effective distribution of heat, the example systems described herein substantially eliminate the need to limit peak air temperature exiting the engine via the EIIPS system, thereby allowing greater flexibility of engine parameters, control and design. Examples described herein are relatively low-cost and low-weight, low in design complexity and relatively easy and cost-effective to manufacture. Additionally, the examples described herein improve effectiveness of anti-icing systems and may be used and/or adapted to upgrade existing anti-icing systems.

Figure 1:
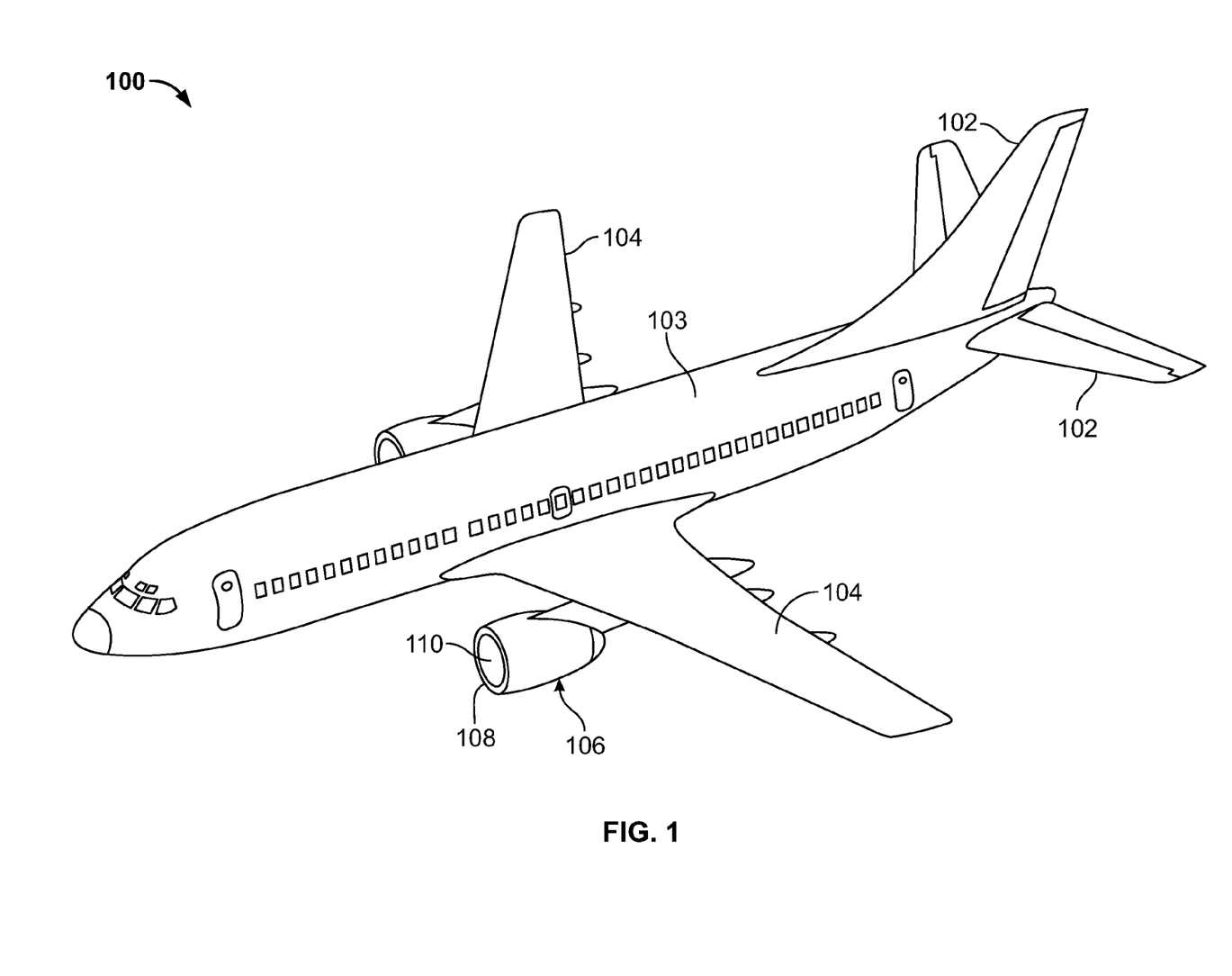
FIG. 1 illustrates an example aircraft in which the examples disclosed herein can be implemented.

FIG. 1 illustrates an example aircraft 100 having stabilizers 102 and wings 104 attached to a fuselage 103 in which the examples described herein can be implemented. An engine nacelle 106 is attached to the wing 104 and has an inlet 108 (e.g., inlet lip skin) on an inlet side of the nacelle 106, and defines an inlet opening 110 for an aircraft engine. The inlet opening 110 may be blocked by ice particles that form on the inlet 108. The anti-icing system described herein may be applied to the nacelle 106, any of the fins 102, the wings 104 and/or any other exterior or outboard structure (e.g., a horizontal stabilizer, a wing strut, an engine strut, a canard stabilizer, etc.) of the fuselage 103.

Figure 2A:
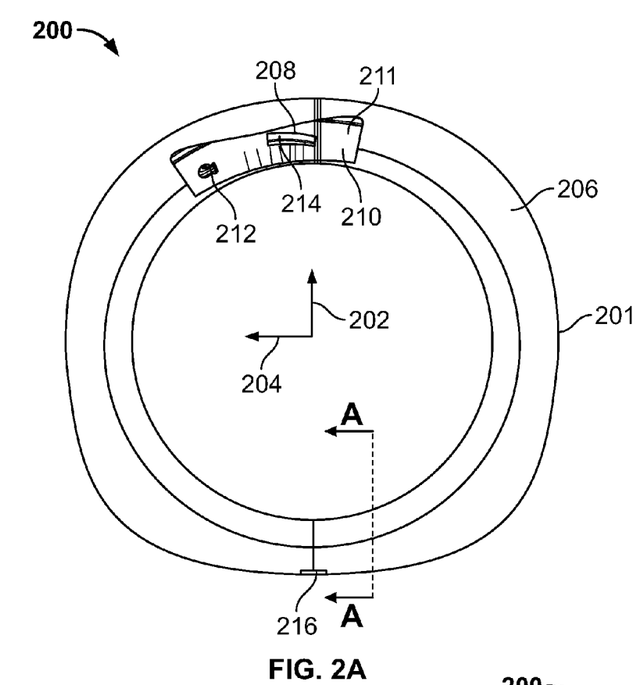
FIG. 2A is a frontal cutaway view of an engine nacelle of an example anti-icing system in accordance with the teachings of this disclosure.

FIG. 2A is a frontal cutaway view of an example anti-icing system 200 of an engine nacelle 201 in accordance with the teachings of this disclosure. The anti-icing system 200 may be applied to, for example, an outboard structure on a fore side of an aircraft (e.g., the aircraft 100 of FIG. 1). An arrow 202 generally indicates an upward or vertical direction and an arrow 204 generally indicates an inboard direction, as viewed from a forward perspective of a left engine, towards a fuselage of the aircraft to which the nacelle 201 is attached. An inlet 206 defines an inlet surface of the engine nacelle 201. A cutaway 208 of the inlet 206 shows a bulkhead 210 onto which both a gas delivery system, which is an EIIPS nozzle 212 in this example, and a deflector vane 214 are mounted. In this example, the inlet 206 and the bulkhead 210 define an annular chamber (e.g., annular duct) 211. The EIIPS nozzle 212 delivers a first gas (e.g, heated and/or compressed air) from an engine, which may or may not be mounted onto the nacelle 201, into the annular chamber 211. The first gas is delivered to the EIIPS nozzle 212, via a duct from the engine, and heats the annular chamber 211 while entraining a second gas (e.g., a cooler gas and/or a gas at a different temperature from the first gas, etc.) to define a flow (e.g., a circulating flow) within the annular chamber 211. In this example, the anti-icing system 200 has an exit opening 216 through which a portion of or all of the flow may exit the annular chamber 211 as the flow circulates through the annular chamber 211. The exit opening 216 may be located on any appropriate portion of the inlet 206 (e.g., inlet lip skin) or the flow and/or a portion of the flow may exit through the bulkhead 210 via ducting. The exit opening 216 may have a louvered outlet or any other appropriate outlet geometry. Additionally or alternatively, the annular chamber 211 may have numerous exit openings. Operation of the EIIPS nozzle 212 and the deflector vane 214 will be discussed in greater detail in connection with FIGS. 3A and 3B.

Figure 2B:
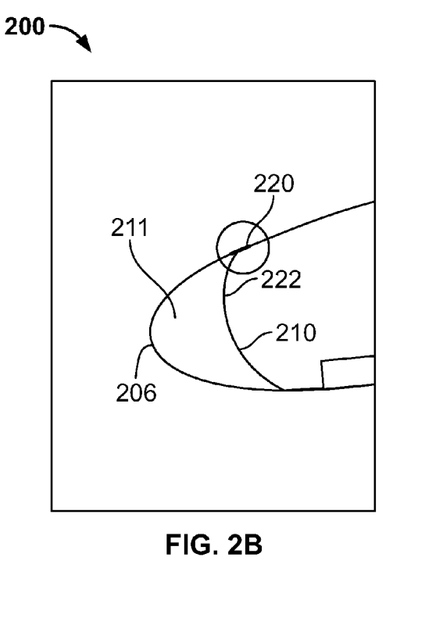
FIG. 2B is a cross-sectional view of the example anti-icing system of FIG. 2A.

FIG. 2B is a cross-sectional view of the example anti-icing system 200 along the line A-A of FIG. 2A. A relatively flat fastener surface 220 may be used to receive fasteners to attach the inlet 206 to the bulkhead 210, thereby mounting the inlet 206 to the engine nacelle and, as mentioned above in connection with FIG. 2A, defining the annular chamber 211. The fastener surface 220 allows removal and alignment of the inlet 206 to the nacelle of the aircraft. In this example, the bulkhead 210 has a contour 222 as viewed along the cross section. Alternatively, the bulkhead 210 may have a relatively flat surface as viewed along the cross-section.

Figure 3A:
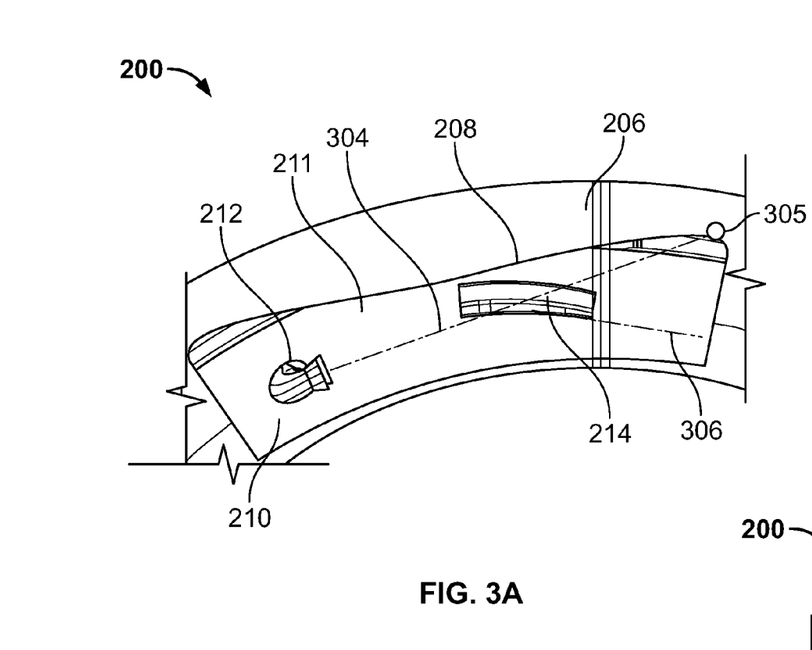
FIG. 3A is a detail view of the frontal cutaway of the example anti-icing system of FIG. 2A.

FIG. 3A is a detail view of the cutaway 208 of the example anti-icing system 200 of FIG. 2A. A dotted line 304 represents a flow of heated gas, which is air in this example, emerging from the EIIPS nozzle 212 in an example where there is no deflecting vane 214 to deflect the flow. In such an example, the heated air impinges directly on a region 305 of the inlet 206 resulting in a highly concentrated heat zone (e.g., high peak temperature spot) at the region 305. The addition of the deflector vane 214 allows the inlet 206 to experience decreased peak temperatures. The deflector vane 214 redirects the flow in a direction generally indicated by a line 306 to increase the flow distance to the inlet 206 and, thus, increase entrainment (e.g., mixing) and viscous dissipation of the high velocity jet with cooler air. In other words, increasing the flow path allows the heated air emerging from the EIIPS nozzle 212 to entrain a second gas (e.g., cooler air) from the annular chamber 211 before the flow impinges on a surface of the inlet 206. In one example, it was shown that a deflector vane reduced peak inlet temperatures by approximately 36° F., but increased minimum inlet temperatures by approximately 27° F. and, thus, more-effectively distributed thermal energy throughout the system.

Additionally or alternatively, the heated air emerging from the EIIPS nozzle 212 impinges the deflector vane 214 instead of the region 305 on the inlet 206 and, thus, transfers heat to the deflector vane 214. The heat transferred to the deflector vane 214 may further conduct into the bulkhead 210. Additionally or alternatively, the flow redirection may be used to redirect the flow towards the inlet center, thereby heating the portions of the inlet 206 on an inner barrel of an engine inlet, which are more critical to preventing ice that can affect engine performance and/or damage the engine.

Figure 3B:
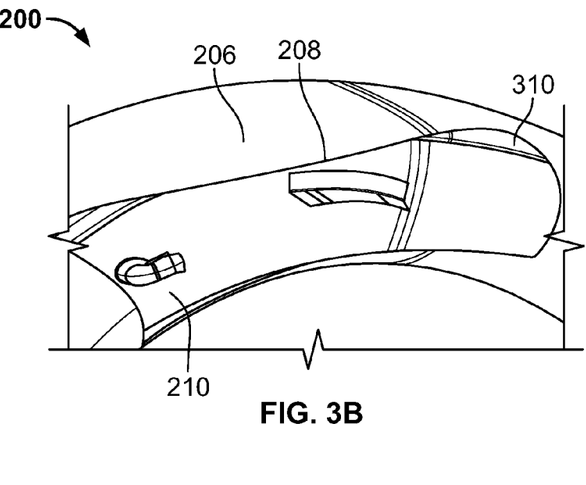
FIG. 3B is an isometric detail view of the example anti-icing system of FIG. 2A.

FIG. 3B is an isometric detail view of the cutaway 208 of the example anti-icing system 200 of FIG. 2A. The bulkhead 210 may also have geometry 310 to substantially match the shape of the outer attach angle of the inlet 206 and to couple to the inlet 206 via fasteners. The inlet 206 may be made of aluminum or any other appropriate material. The anti-icing system 200 allows use of relatively inexpensive materials such as, for example, aluminum for the inlet 206 as opposed to, for example, titanium, which may be relatively expensive and difficult to fabricate.

Figure 4A:
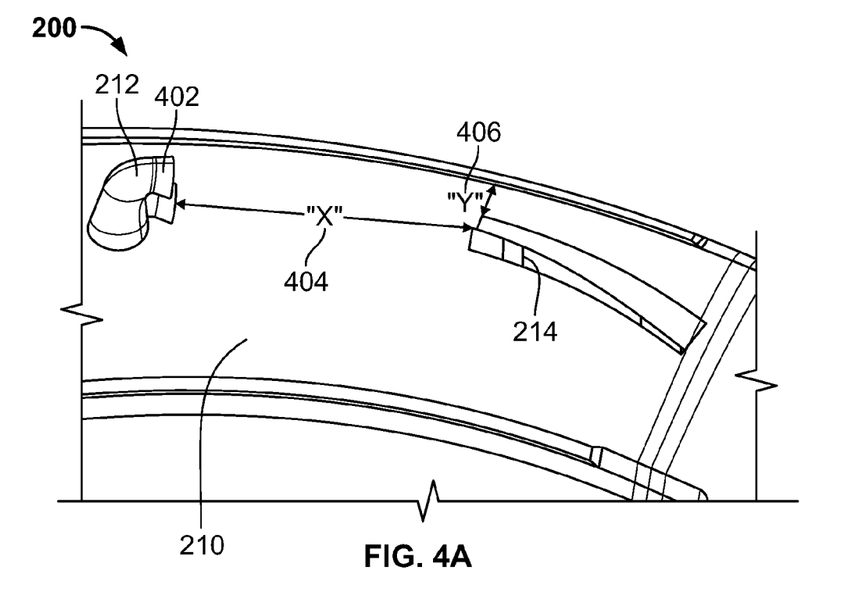
FIG. 4A is another detail view of the frontal cutaway of the example anti-icing system of FIG. 2A.

FIG. 4A is another detail view of the example anti-icing system 200 of FIG. 2A. In this example, the EIIPS nozzle 212 has a dual outlet 402. While the dual outlet 402 is shown, any appropriate nozzle configuration may be used, including a single outlet, multiple nozzles, those described in U.S. Pat. No. 4,688,745, which is incorporated by reference in its entirety, etc. A dimension 404, represented by "X," may be any appropriate length dependent on a multitude of factors including, but not limited to, temperature and pressure of air exiting the EIIPS nozzle 212, materials used in the chamber (e.g., thermal conductivity of the materials, etc.), design requirements including material selection, geometry of the inlet 206, configuration of the EIIPS nozzle 212, etc. Likewise, a dimension 406, represented by "Y," may be any appropriate dimension dictated by the aforementioned factors related to the dimension 404. The deflector vane 214 may be fastened to the bulkhead 210 via fasteners. Alternatively, the deflector vane 214 may be welded, adhered, or attached through any other appropriate attachment methods.

Figure 4B:
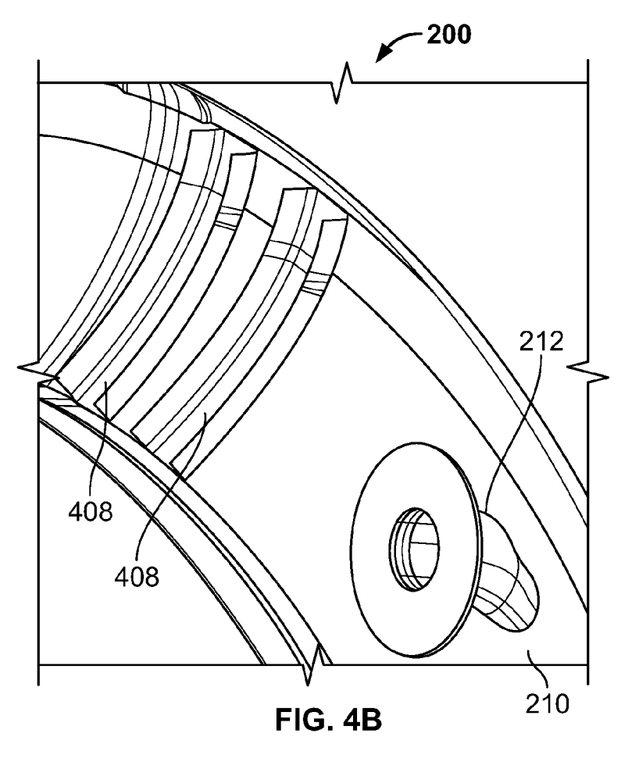
FIG. 4B is another isometric view of the example anti-icing system of FIG. 2A as viewed from the opposite side of the bulkhead.

FIG. 4B is another isometric view of the example anti-icing system 200 of FIG. 2A as viewed from the opposite side of the bulkhead 210. A rear side of the EIIPS nozzle 212 mounts to the bulkhead 210. The anti-icing system 200 may also include c-channel stiffeners 408, mounted onto the bulkhead 210 on the opposite side of the deflector vane 214 to reinforce the bulkhead 210 and/or the deflector vane 214, thereby preventing localized deformation to the bulkhead 210 and/or the deflector vane 214 as the flow emerging from the nozzle 212 impinges on the deflector vane 214. In some examples, the stiffeners 408 may also provide additional heat dissipation and/or spreading of heat from the air emerging out of the EIIPS nozzle 212. The stiffeners 408 may be attached to the bulkhead and/or the deflector vane 214 via fasteners or attached through any other appropriate method of attachment (e.g., welded, adhered, etc.). Additionally or alternatively, the bulkhead 210 may also be reinforced through metal forming (i.e., producing forms to increase rigidity of the surface of the bulkhead 210).

Figure 5A:
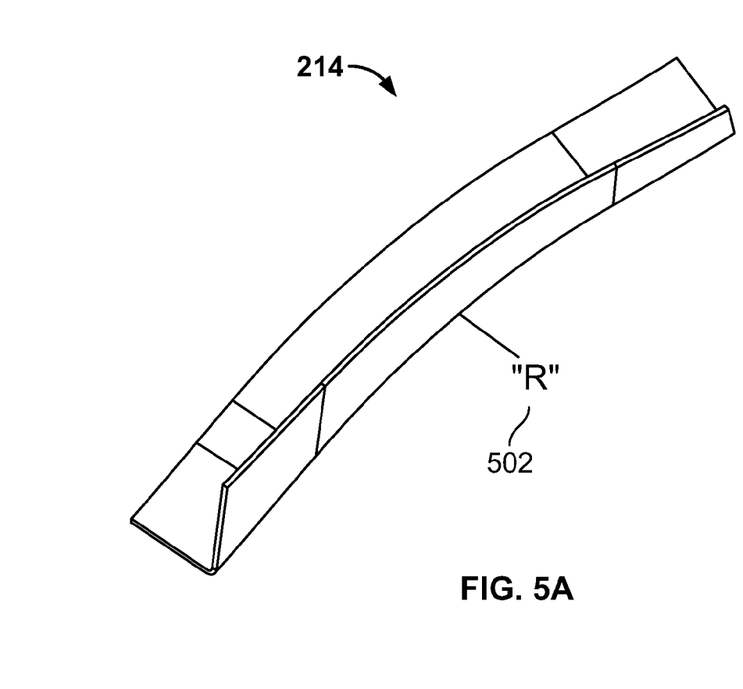
FIGS. 5A and 5B are views of the deflector vane of the example anti-icing system of FIGS. 2A, 2B, 3A, 3B, 4A and 4B.
Figure 5B:
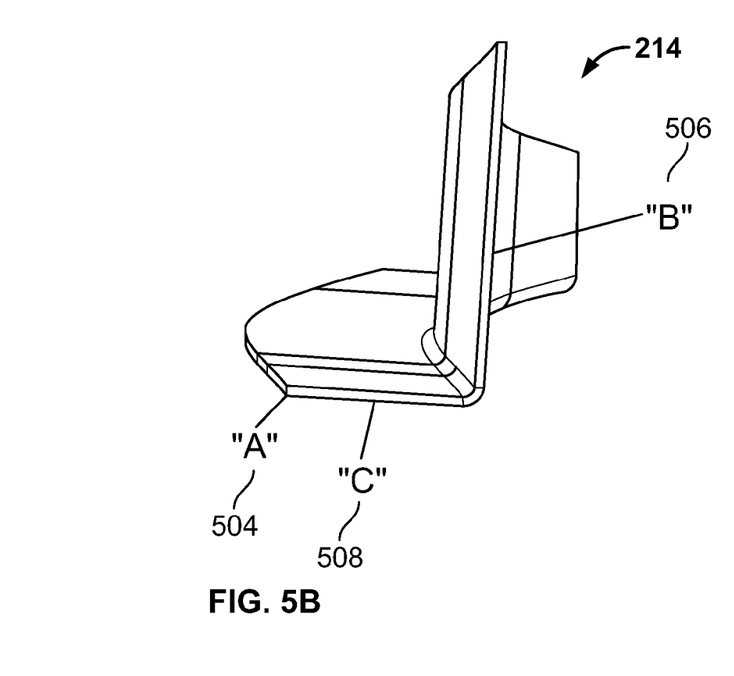

FIGS. 5A and 5B are views of the deflector vane 214 of the example anti-icing system 200 of FIGS. 2A, 2B, 3A, 3B, 4A and 4B. A dimension 502, represented by "R," is a curvature radius. A dimension 504, represented by "A," is the thickness of the deflector vane 214. Dimensions 506 and 508 represented by "B" and "C" are edge-wise dimensions of the deflector vane 214. The deflector vane 214 may be made of titanium aluminum alloy or any other appropriate material. The deflector vane 214, in this example, has a curved shape to redirect the flow. While the deflector vane 214 is depicted as having a curved shape, it may have other redirecting geometry including a straight angle, a relatively sharp angle, etc.

Figure 6A:
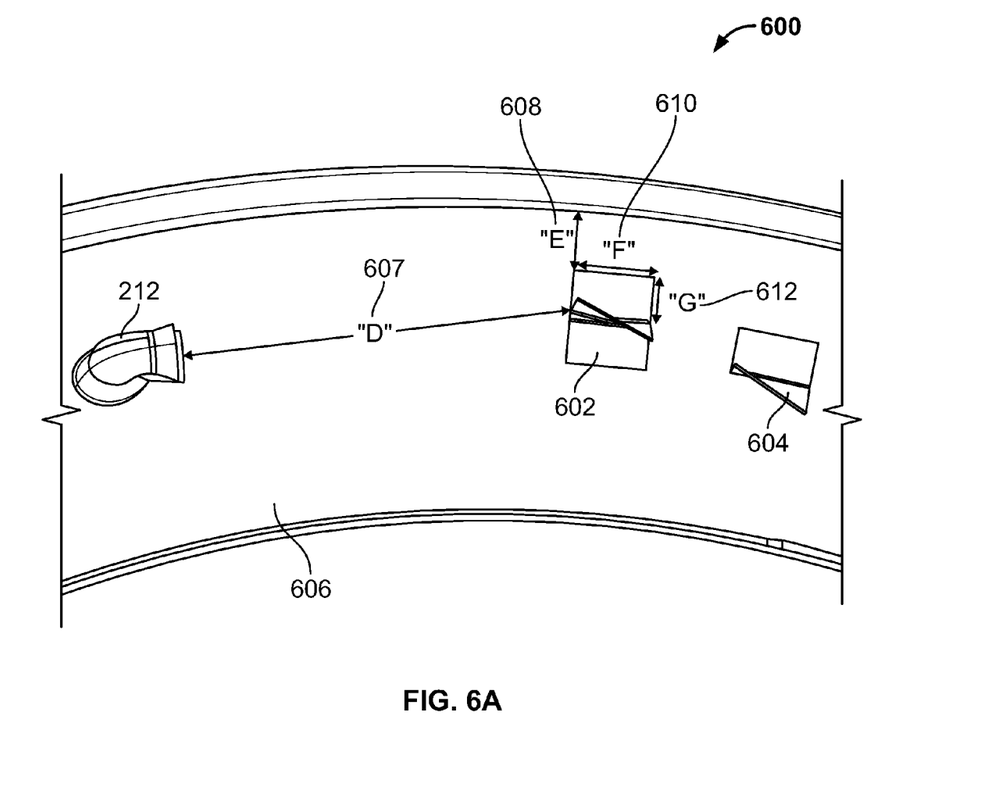
FIG. 6A is a view of another example anti-icing system with multiple vanes.

FIG. 6A is a view of another example anti-icing system 600 with multiple vanes. In this example, a first deflector vane 602 is upstream of a second deflector vane 604, which further re-directs the flow emerging from the EIIPS nozzle 212. In this example, the deflector vanes 602, 604, which are mounted onto a bulkhead 606, have different geometries. However, the deflector vanes 602, 604 may have substantially the same or substantially similar geometry (i.e., they may be the same fabricated part). The addition of the second vane 604 may allow additional heat removal from further flow redirection, which may result in a greater flow distance from the EIIPS nozzle 212 to an impingement point on the inlet 206, thereby allowing increased flow entrainment with cooler air within the chamber and/or additional contact of the flow with the deflector vane 604 to remove additional heat. In some examples, there may a total of two or more of the deflector vanes 602 or two or more of the deflector vanes 604. Alternatively, there may be only one of the deflector vanes 602, 604 mounted onto the bulkhead 606, or any other appropriate combination of the deflector vanes 214, 602, 604. Similar to the deflector vane 214, the deflector vanes 602, 604 may be made of titanium aluminum alloy or any other appropriate material. A dimension 607, represented by "D," is the impingement distance from the EIIPS nozzle 212 to the deflector vane 602. A dimension 608, represented by "E," is the vertical placement of the EIIPS nozzle 212 to the deflector vane 602. A dimension 610, represented by "F," is the width of the plate. A dimension 612, represented by "G," is the distance from the impingement point to the edge of the deflector vane 602. The dimensions 607, 608, 610, 612 may be adjusted based on a multitude of factors including application, overall dimensions of the bulkhead 606, gas temperature exiting the EIIPS nozzle 212, number of deflector vanes, necessary entrainment distance, etc.

Figure 6B:
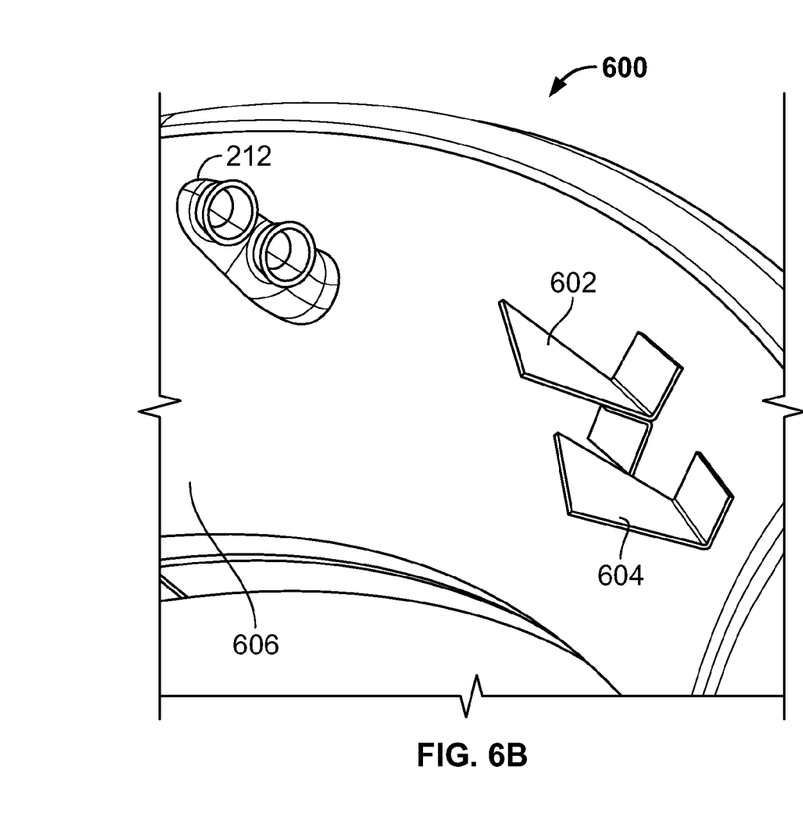
FIG. 6B is an isometric view of the example anti-icing system of FIG. 6A.

FIG. 6B is an isometric view of the example anti-icing system 600 of FIG. 6A. The deflector vane 602 has a t-shaped reinforced structure, whereas the deflector vane 604 has an l-shaped structure. In this example, the deflector vanes 602, 604 are mounted to the bulkhead 606 via fasteners (i.e., screwed onto the bulkhead 606). However, the deflector vanes 602, 604 may be mounted to the bulkhead 606 by welds, adhesive or any appropriate attachment method. Alternatively, the deflector vanes 602, 604 may be formed onto the bulkhead 606 through a bonding process or fabrication (e.g., sheet metal bending or forming, etc.). Additionally, more deflector vanes may be added to further redirect the flow from the EIIPS nozzle 212, as needed.

Figure 6C:
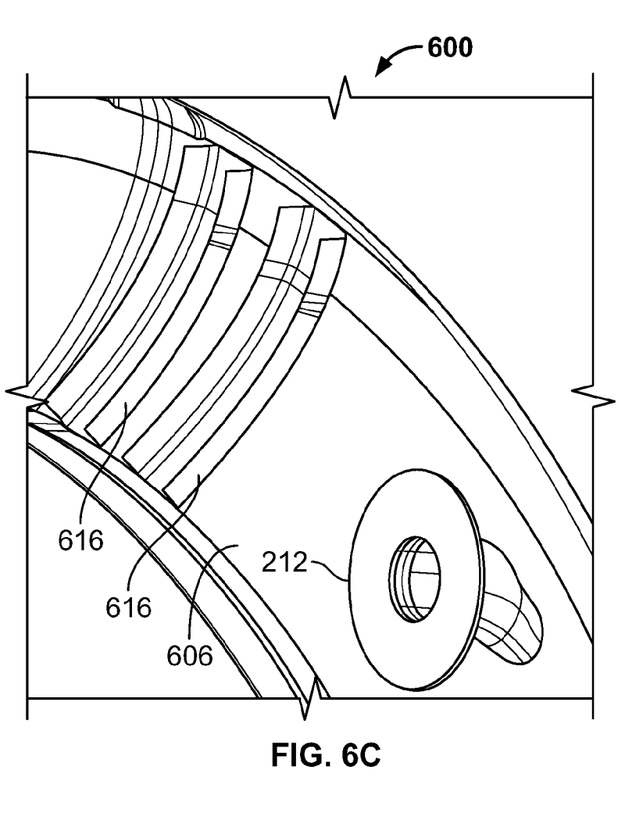
FIG. 6C is another isometric view of the example anti-icing system of FIGS. 6A and 6B as viewed from the opposite side of the bulkhead.

FIG. 6C is another isometric view of the example anti-icing system 600 of FIGS. 6A and 6B as viewed from the opposite direction of the bulkhead 606. Similar to the anti-icing system 200, the anti-icing system 600 may also include stiffeners 616 to reinforce the deflector vanes 602, 604 and/or the bulkhead 606 relative to the flow emerging from the EIIPS nozzle 212. Similar to the anti-icing system 200, the stiffeners 616 may have a c-channel shape and may be fastened to the bulkhead 606. Alternatively, the stiffeners 616 may be welded or adhered onto a surface the bulkhead 606, or attached any other appropriate attachment method. Additionally or alternatively, the bulkhead 606 may also be reinforced through metal forming (i.e., producing forms to increase rigidity of the surface of the bulkhead 606).

Figure 6D:
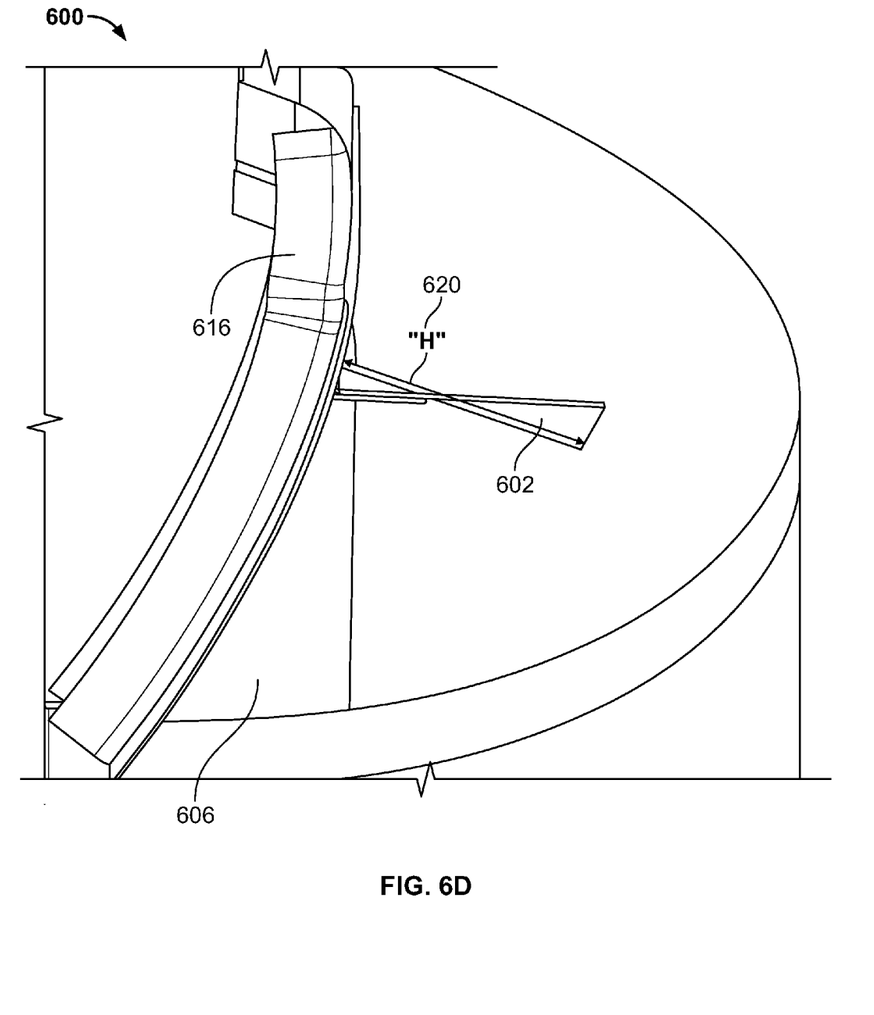
FIG. 6D is a cross-sectional view of an engine inlet annulus of the example anti-icing system of FIGS. 6A, 6B and 6C.

FIG. 6D is a cross-sectional view of an engine inlet annulus of the example anti-icing system 600 of FIGS. 6A, 6B and 6C. A dimension 620, represented by "H," is a distance from a surface of the bulkhead 606 to the end of the deflector vane 602.

Figure 7A:
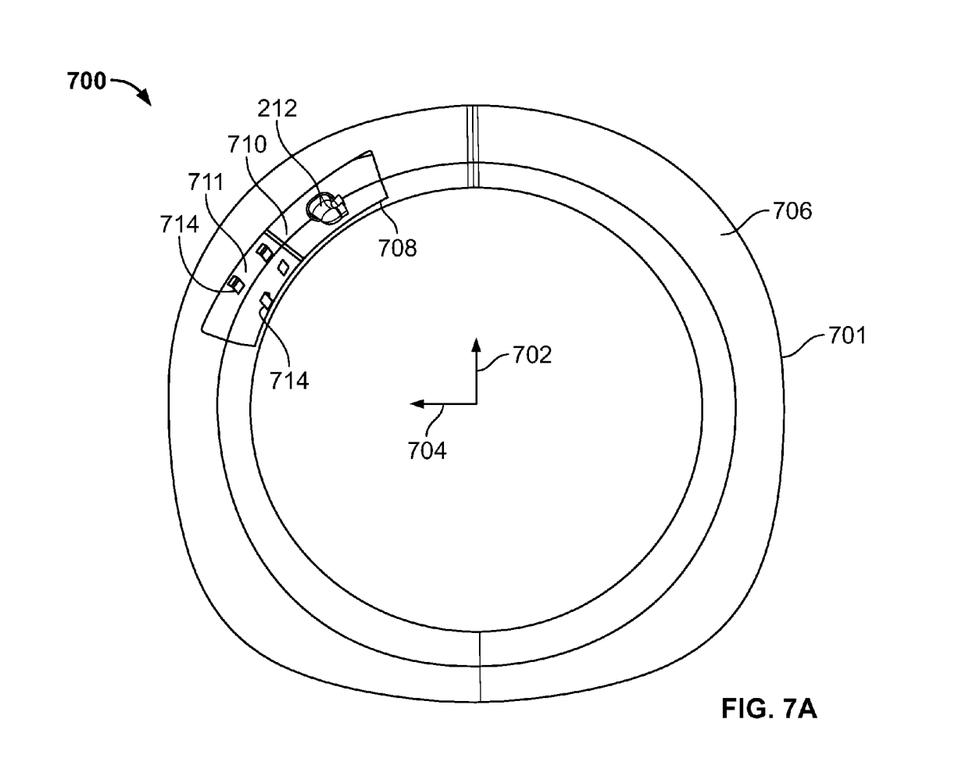
FIG. 7A is a frontal cutaway view of an engine nacelle inlet of another example anti-icing system.

FIG. 7A is a frontal cutaway view of an engine nacelle 701 of another example anti-icing system 700. The anti-icing system 700 may be applied to, for example, an outboard structure on a fore side of an aircraft (e.g., the aircraft 100 of FIG. 1). An arrow 702 generally indicates an upward or vertical direction and an arrow 704 generally indicates an inboard direction, as viewed from a forward perspective of a left engine towards a fuselage of the aircraft. An inlet 706 (e.g., inlet lip skin) defines an inlet surface. A cutaway 708 of the inlet 706 shows a bulkhead 710 to which, in this example, both the gas delivery system, which is the EIIPS nozzle 212 in this example, and deflector vanes 714 are mounted. The inlet 706 and the bulkhead 710 define an annular chamber 711. Similar to the anti-icing system 200, in this example, the EIIPS nozzle 212 delivers a first gas (e.g., heated air) from an engine, which may be mounted in the nacelle 701, into the annular chamber 711. The first gas may be delivered to the EIIPS nozzle 212 via a duct from the engine and heats the annular chamber 711 while entraining a second gas (e.g., a cooler gas and/or a gas at a different temperature from the first gas) to define a flow (e.g., a circulating flow) within the annular chamber 711. Likewise, the inlet 706 may also include an outlet to allow a portion of the flow to exit the annular chamber 711.

Figure 7B:
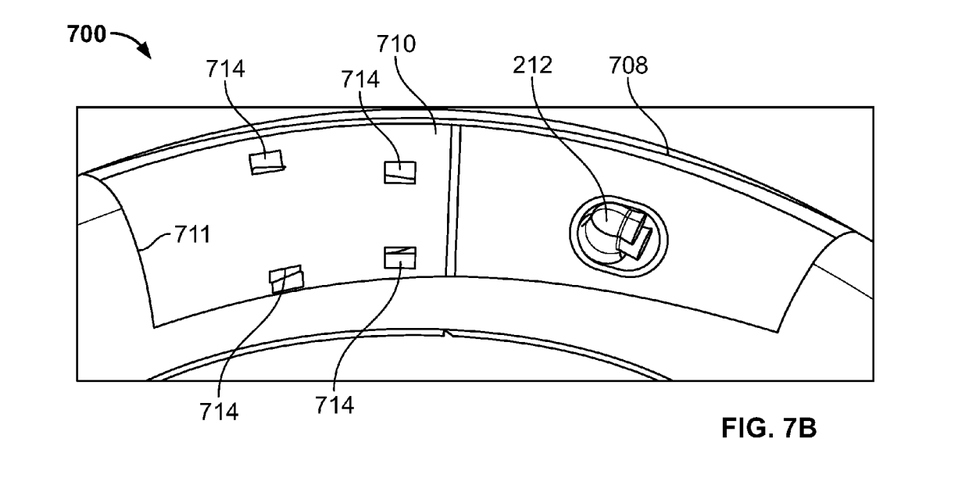
FIG. 7B is a detail view of the frontal cutaway of the anti-icing system of FIG. 7A.

FIG. 7B is a detailed view of the cutaway 708 of the anti-icing system 700 of FIG. 7A. The deflector vanes 714, in this example, increase the mixing of heated gas emerging from the EIIPS nozzle 212 by redirecting recirculating flow into the heated gas emerging from the EIIPS nozzle 212. As the flow circulates through the annular chamber 711, the deflector vanes 714 may also increase mixing of the gas by redirecting and/or interrupting the flow at various locations in the annular chamber 711. While four of the deflector vanes 714 are shown in this example, any appropriate number of deflector vanes at any appropriate position relative to the EIIPS nozzle 212 may be used (e.g., the arrangement of deflector vanes 714 may be in front of the EIIPS nozzle 212). The deflector vanes 714 may be used in conjunction with the deflector vane 214 of the anti-icing system 200 and/or the deflector vanes 602, 604 or any other appropriate combination of the vanes 214, 602, 604. Additionally or alternatively, the deflector vanes 714 and/or the bulkhead 710 may be reinforced by stiffeners and/or forms in the bulkhead 710.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described, the example apparatus may be applied to vehicles, aerodynamic structures, etc.

What is claimed is:

1. An apparatus comprising:
   a skin on an inlet side of a nacelle of an aircraft defining an annular chamber;
   a gas delivery system including a nozzle disposed within the annular chamber, the nozzle to provide a first gas to mix with and entrain a second gas in the annular chamber to define a flow through the annular chamber, wherein the second gas is at a different temperature from the first gas; and
   a deflector vane disposed within the annular chamber and in a direct impingement flow path of the nozzle, the deflector vane to redirect the flow through the annular chamber to increase a flow path length of the flow through the annular chamber.

2. The apparatus as defined in claim 1, wherein the deflector vane includes a first deflector vane, and further comprising a second deflector vane to further redirect the flow after the flow is directly impinged on the first deflector vane.

3. The apparatus as defined in claim 2, further comprising a bulkhead further defining the annular chamber and coupled to the first and second deflector vanes.

4. The apparatus as defined in claim 3, further comprising a stiffener coupled to the bulkhead to support the first and second deflector vanes.

5. The apparatus as defined in claim 2, further comprising a c-channel coupled to a bulkhead that further defines the annular chamber, the c-channel to support the first and second deflector vanes.

6. The apparatus as defined in claim 1, wherein the first gas is provided by an engine in the nacelle.

7. The apparatus as defined in claim 1, further comprising a bulkhead further defining the annular chamber and coupled to the nozzle.

8. The apparatus as defined in claim 1, wherein the deflector vane comprises a t-flange for reinforcement.

9. The apparatus as defined in claim 1, further including diverging vanes to converge the flow towards a first end of the nozzle that is opposite a second end of the nozzle from which the flow exits the nozzle.

10. An apparatus comprising:
    a chamber in an outboard structure of an aircraft, the chamber on a fore side of the outboard structure;
    a gas delivery system including a nozzle disposed within the chamber having an outlet to provide a gas to the chamber, the gas to define a flow through the chamber; and
    a deflector vane disposed in a direct impingement flow path of the nozzle, wherein the deflector vane is to redirect the flow through the chamber to increase a flow path length of the flow by causing the flow to impinge the deflector vane prior to impinging an inner surface of the chamber.

11. The apparatus as defined in claim 10, wherein the deflector vane includes a first deflector vane, and further comprising a second deflector vane to further redirect the flow.

12. The apparatus as defined in claim 11, further comprising a bulkhead defining the chamber and coupled to the first and second deflector vanes.

13. The apparatus as defined in claim 10, wherein the gas is provided by an engine.

14. The apparatus as defined in claim 13, wherein the engine is in the outboard structure.

15. The apparatus as defined in claim 10, further comprising a bulkhead defining the chamber and coupled to the nozzle.

16. The apparatus as defined in claim 15, further comprising a c-channel coupled to the bulkhead to support the deflector vane.

17. The apparatus as defined in claim 10, wherein the deflector vane comprises a t-flange stiffener for reinforcement.

18. A method comprising:
   receiving a gas into a chamber of an aircraft, the gas to define a flow from a nozzle into the chamber in a first flow path direction; and
   impinging the flow onto a vane that is in a direct impingement flow path relative to the nozzle to re-direct the flow in a second flow path direction within the chamber to increase a flow path length of the flow.

19. The method as defined in claim 18, further comprising mixing the flow within the chamber.

20. The method as defined in claim 18, further comprising redirecting the flow in a third flow path direction within the chamber.

21. The method as defined in claim 18, further comprising reinforcing the vane to redirect the flow in the second flow path direction.

\* \* \* \* \*